United States Patent
Zhu et al.

(10) Patent No.: US 8,861,966 B2
(45) Date of Patent: Oct. 14, 2014

(54) METHOD AND SYSTEM FOR BAND BLOCKING IN AN OPTICAL TELECOMMUNICATION NETWORK

(75) Inventors: Fei Zhu, San Jose, CA (US); Yu Sheng Bai, Los Altos Hills, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1126 days.

(21) Appl. No.: 11/863,226

(22) Filed: Sep. 27, 2007

(65) Prior Publication Data

US 2008/0138066 A1 Jun. 12, 2008

Related U.S. Application Data (60) Provisional application No. 60/868,966, filed on Dec. 7, 2006.

(51) Int. Cl.
*H04J 14/02* (2006.01)
*H04J 14/00* (2006.01)

(52) U.S. Cl.
USPC .................................. 398/83; 398/48; 398/55

(58) Field of Classification Search
USPC .......................................... 398/45–57, 79, 83
See application file for complete search history.

(56) References Cited

U.S. PATENT DOCUMENTS

| | | | |
|---|---|---|---|
| 6,348,984 B1 * | 2/2002 | Mizrahi | .......................... 398/79 |
| 6,504,970 B2 | 1/2003 | Doerr | |
| 6,996,307 B2 | 2/2006 | Chandrasekhar et al. | |
| 7,014,326 B2 | 3/2006 | Danagher et al. | |
| 2002/0131684 A1 | 9/2002 | Doerr | |
| 2002/0149818 A1 | 10/2002 | Tomofuji et al. | |
| 2003/0067650 A1 | 4/2003 | Khalfallah et al. | |
| 2003/0175030 A1 | 9/2003 | Chen et al. | |
| 2004/0130774 A1 | 7/2004 | Giles et al. | |
| 2005/0281557 A1 * | 12/2005 | Fishman et al. | ................ 398/49 |

FOREIGN PATENT DOCUMENTS

| | | |
|---|---|---|
| EP | 1 463 224 A2 | 9/2004 |
| EP | 1 492 260 A1 | 12/2004 |
| EP | 1 508 987 A2 | 2/2005 |
| EP | 1 608 097 A2 | 12/2005 |

OTHER PUBLICATIONS

"Dynamically Reconfigurable Wavelength Blocker for C Band", Feb. 2006, JDS Uniphase Corporation, 10143119 Rev. 002, pp. 1-3.*
Rhee, "A Broadcast-and-Select OADM Optical Network With Dedicated Optical-Channel Protection", Journal of Lightwave Technology, Jan. 2003, pp. 25-31, vol. 21, No. 1.

(Continued)

*Primary Examiner* — Daniel Dobson (57) ABSTRACT

Method and system for band blocking in an optical telecommunication network. According to an embodiment, the present invention provides a system for optical network. The system includes an input that is configured to receive an input signal through a first optical input. The system also includes a band splitting module that is coupled to the input. The band splitting module is configured to separate the input signal into a plurality of bands. The plurality of bands includes a first band and a second band. The first band includes a first plurality of wave channels. The first plurality of wave channels is characterized by a first channel spacing. The second band includes a second plurality of wave channels, which is characterized by a second channel spacing.

27 Claims, 7 Drawing Sheets

(56) References Cited

OTHER PUBLICATIONS

Vasilyev, "Broadcast and Select" OADM in 80×10.7 Gb/s Ultra-Longhaul Network, IEEE Photonics Technology Letters, Feb. 2003, pp. 332-334, vol. 15, No. 2.

Wilfong, "WDM Cross-Connect Architectures with Reduced Complexity", Journal of Lightwave Tecnology, Oct. 1999, pp. 1732-1741, vol. 17, No. 10.

Supplementary European Search Report dated Dec. 16, 2009 in connection with European Patent Application No. EP 07 81 7317.

Written Opinion of the International Searching Authority dated Mar. 6, 2008 in connection with International Patent Application No. PCT/CN2007/071127.

International Search Report dated Mar. 6, 2008 in connection with International Patent Application No. PCT/CN2007/071127.

Communication pursuant to Article 94(3) EPC dated Jan. 16, 2012 in connection with European Patent Application No. 07 817 317 .6.

* cited by examiner

Figure 1

(Prior Art)

Figure 2

(Prior Art)

Add input

METHOD AND SYSTEM FOR BAND BLOCKING IN AN OPTICAL TELECOMMUNICATION NETWORK

CROSS-REFERENCES TO RELATED APPLICATIONS

This application claims priority to U.S. Provisional Application No. 60/868,966, filed Dec. 7, 2006, which is incorporated by reference herein for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This application relates in general to telecommunication network. More specifically, the present invention provides a system and method for band blockers that are to be used in optical telecommunication networks. In a specific embodiment, a wavelength division multiplexing system is capable of using wavelength channels at different channel spacing, which can be as low at 25 GHz, through the use of band blockers afforded by the present invention. As an example, band blockers according to the present invention separate frequency channels into multiple bands, each band consists of a predetermined number of channels characterized by the same channel spacing, but it should be understood that embodiments of the present invention have a wide range of applicability.

With advent of the information super highway, telecommunication techniques and infrastructures developed at a rapid pace in the recent years. Telecommunication networks are becoming faster and more reliable. One of the innovations that allowed for faster network has been the introduction of optical telecommunication networks, in which data are transmitted through fiber optical lines.

To take advantage of the characteristics of optical networks, wavelength division multiplexing (WDM) is used. The WDM technique involves multiplexing multiple optical carrier signals on a single optical fiber by using different wavelengths (colors) of laser light to carry different signals. This technique allows for a multiplication in capacity, thereby also making it possible to perform bidirectional communications over a single strand of fiber. The true potential of optical fiber is fully exploited when multiple beams of light at different frequencies are transmitted on the same fiber. For example, this techniques can be seen is a form of frequency division multiplexing (FDM), but is commonly referred as wavelength division multiplexing. The term "wavelength-division multiplexing" is commonly applied to an optical carrier (which is typically described by its wavelength), whereas frequency-division multiplexing typically applies to a radio carrier (which is more often described by frequency). However, since wavelength and frequency are inversely proportional, and since radio and light are both forms of electromagnetic radiation, the two terms are closely related.

A modern WDM optical transport system is typically capable of transmitting several tens and hundreds of wavelengths (or channels) over a distance of several hundreds and even thousands kilometers. Each wavelength/channel may carry several or several tens of Gb/s data. However, not all channels are starting from and/or going to the same destination. Wavelengths/channels may be dropped and added at any POP (Point Of Presence) along an optical fiber WDM transmission line.

A convenient and cost-effective solution is to add/drop wavelengths in optical domain to/from a multi-wavelength WDM signal using an Optical Add/Drop Multiplexer (OADM). An even more desirable solution is to have a reconfigurable OADM (ROADM) and thus the number and allocation of add/drop wavelengths can be provisioned as demands change without affecting channels already in-services. For example, a reconfigurable optical add-drop multiplexer (ROADM) is a form of optical add-drop multiplexer that adds the ability to remotely switch traffic from a WDM system at the wavelength layer. This allows individual wavelengths carrying data channels to be added and dropped from a transport fiber without the need to convert the signals on all of the WDM channels to electronic signals and back again to optical signals.

Figure 1:
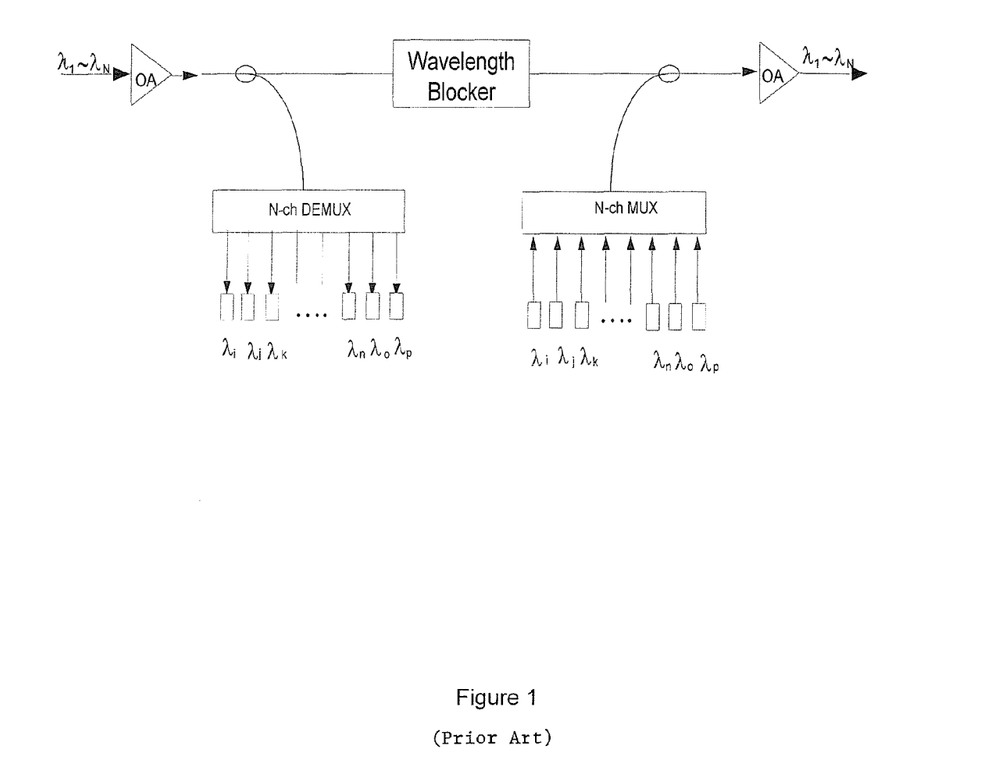
FIG. 1 is a simplified diagram illustrating a conventional broadcast and select ROADM system.

FIG. 1 is a simplified diagram illustrating a conventional broadcast and select ROADM system. The system 100 is implemented with a power splitter that divides an incoming WDM line signal between the drop and main paths. In the drop path, specific wavelengths/channels are selected using a wavelength demultiplexer or a filter. In the main path, a wavelength blocker (WB) blocks any selected (drop) channels and passes through others (express). As an example, a coupler may be used thereafter to add channels to the main path.

The use of broadcast and select ROADM based systems typically requires the use of wavelength blockers (WB). Depending on the application, a WB can be constructed with one or more arrayed waveguide grating (AWG). For example, a couple of AWGs may be arranged in a back-to-back as an array of on-off switches in between.

Figure 2:
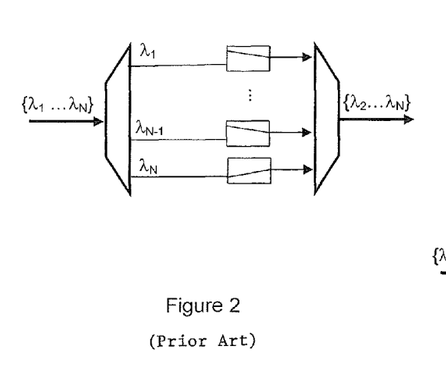
FIG. 2 is a simplified diagram of a conventional AWG based WB

FIG. 2 is a simplified diagram of a conventional AWG based WB. As shown, an AWG converts an input WDM signal into N demultiplexed output signals. For example, each output signal is connected to an on-off switch, and therefore can be blocked or passed independently. Another AWG multiplexes the modified WDM channels back to the output WDM line signal. As an example, when on-off switches are replaced with 1×2 switches, functions such as the wavelength blocking and channel-adding, can be accomplished in one step in a single module. For example, such module is often referred to as an Add Module.

Figure 2A:
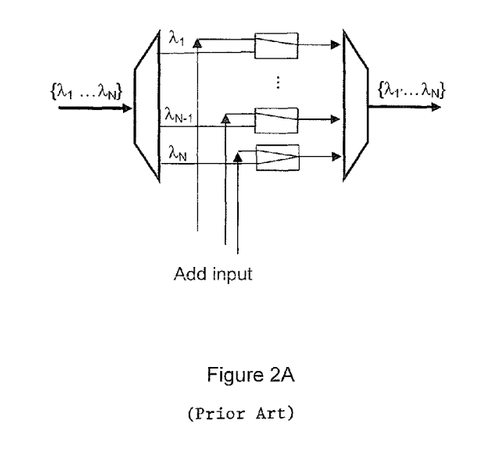
FIG. 2A is a simplified diagram of a conventional Add Module.

FIG. 2b is a simplified diagram of a conventional Add Module. Typically, for a 40-channel WDM system at 100 GHz spacing, there are often more than 160 fiber splicing between 40 egress and ingress ports of AWGs and switches. Such fiber cabling complexity escalates as channel count doubles at 50 GHz spacing.

In addition to the AWG based blockers, there are also other types of WB, such as those based on free-space optics.

Figure 3:
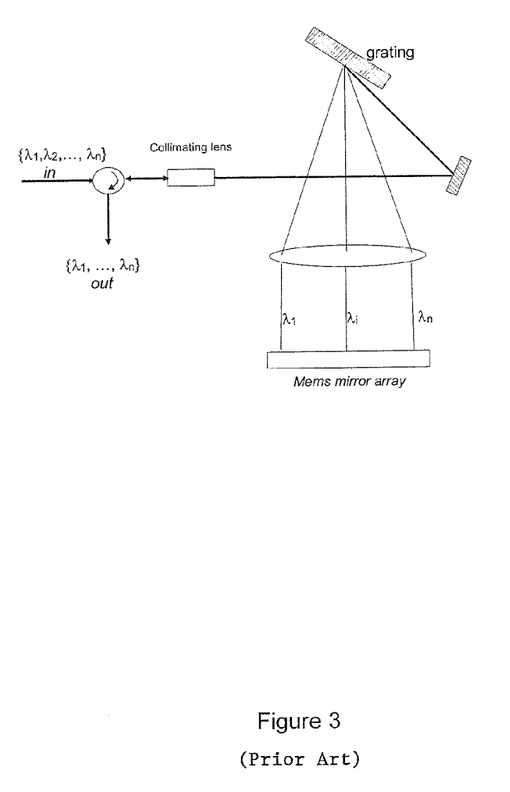
FIG. 3 is a simplified diagram illustrating a MEMS based system for performing wavelength blocking.

Shown in FIG. 3 is a simplified diagram illustrating a MEMS based-system for performing wavelength blocking. Often, a MEMS based WB uses a diffraction grating to separate the input WDM line signal spatially. Dispersed wavelengths/channels are directed to an array of MEMS mirrors or liquid crystal (LC) cells. Each mirror or cell is actively controlled electrically so that any channel may be blocked or passed through. Pass-through channels are reflected back typically to the same grating to form the output WDM line signal.

Conventional WB, such as those discussed above, are often inadequate for various applications. Among other things, conventional WBs are often incapable of providing small channel spacing (e.g., 25 GHz) and multiple channel spacing.

Therefore, improved systems and methods for band blocking is desired.

BRIEF SUMMARY OF THE INVENTION

This application relates in general to telecommunication network. More specifically, the present invention provides a system and method for band blockers that are to be used in optical telecommunication networks. In a specific embodiment, a wavelength division multiplexing system is capable of using wavelength channels at different channel spacing, which can be as low at 25 GHz, through the use of band blockers afforded by the present invention. As an example, band blockers according to the present invention separate frequency channels into multiple bands, each band consists of a predetermined number of channels characterized by the same channel spacing, but it should be understood that embodiments of the present invention have a wide range of applicability.

According to an embodiment, the present invention provides a system for optical network. The system includes an input that is configured to receive an input signal through a first optical input. The system also includes a band splitting module that is coupled to the input. The band splitting module is configured to separate the input signal into a plurality of bands. The plurality of bands includes a first band and a second band. The first band includes a first plurality of wave channels. The first plurality of wave channels is characterized by a first channel spacing. The second band includes a second plurality of wave channels, which is characterized by a second channel spacing, the first channel spacing being different from the second channel spacing. The $1^{st}$ channel spacing can be the same as the $2^{nd}$ channel spacing). The system also includes a plurality of switches. Each switch is configured to provide control for a band. The system further includes a band recombining module that is configured to couple the plurality of bands. The system also includes an output. The output is coupled to the band recombining module. The output is configured to provide an output signal. The input signal is a combination of the plurality of bands.

According to another embodiment, the present invention provides a system for optical network. The system includes an input that is configured to receive a first input signal through a first optical input. The system also includes a band splitting module that is coupled to the input. The band splitting module is configured to separate the input signal into a plurality of bands. The band splitting module includes a first filter and a second filter. The plurality of bands includes a first band and a second band. The first filter is configured to separate the input signal into the first band and a second input signal. The second filter is configured to separate the second input signal into the second band and a third input signal. The first band includes a first plurality of wave channels that are characterized a first channel spacing. The second band includes a second plurality of wave channels that are characterized a second channel spacing. The first channeling spacing may be different from the second channel spacing. The system also includes a plurality of switches. Each switch is configured to provide control for a band. The system also includes a band recombining module that is configured to couple the plurality of bands. The system further includes an output that is coupled to the band recombining module.

According to yet another embodiment, the present invention includes a method for optical network transport. The method includes receiving a first input optical signal. The method also includes splitting the first input optical signal into a predetermined number of bands that includes a first band and a second band. The first band includes a first plurality of wave channels. The first plurality of wave channels is characterized by a first channel spacing. The second band includes a second plurality of wave channels. The second plurality of wave channels is characterized by a second channel spacing. The first channeling spacing is different from the second channel spacing. The method also includes providing control for the bands using a plurality of switches. Also, the method includes coupling the bands into an output. Additionally, the method includes providing the output.

It is to be appreciated that embodiments of the present invention provides many advantages over conventional techniques. For example, the present invention offers a simple and reliable solution to apply broadcast and select ROADM to DWDM transport systems with ultra narrow and/or mixed spacing. Among other things, by providing wave signals in bands of channels of identical channel spacing, the present invention allows wavelengths to be efficiently utilized in optical transport systems. For example, wavelengths at different channel spacings may be transmitted using a main optical line, and then divided up into bands for convenient use. In addition, embodiments of the present invention are relatively inexpensive to implement in comparison to conventional techniques, and are scalable in many ways. It is also to be appreciated that certain embodiments of the present invention are compatible with existing technology, thereby allowing easy implementation. There are other benefits as well.

Various additional objects, features and advantages of the present invention can be more fully appreciated with reference to the detailed description and accompanying drawings that follow.

DETAILED DESCRIPTION OF THE INVENTION

This application relates in general to telecommunication network. More specifically, the present invention provides a system and method for band blockers that are to be used in optical telecommunication networks. In a specific embodiment, a wavelength division multiplexing system is capable of using wavelength channels at different channel spacing, which can be as low at 25 GHz, through the use of band blockers afforded by the present invention. As an example, band blockers according to the present invention separate frequency channels into multiple bands, each band consists of a predetermined number of channels characterized by the same channel spacing, but it should be understood that embodiments of the present invention have a wide range of applicability.

As discussed above, conventional wavelength blockers are often inadequate for various reasons. Among other things, a wavelength blocker designed for certain spacing cannot be used in systems with different spacing. For example, a 100 GHz spaced WB cannot be used directly in DWDM systems of 50 GHz or 25 GHz. Similarly, a 50 GHz spaced one cannot be used directly in DWDM systems of 100 GHz or 25 GHz.

In AWG-based WBs, the restriction on channel spacing is due to the fact that WDM channel spacing has to match what are provided by the AWGs.

Figure 4:
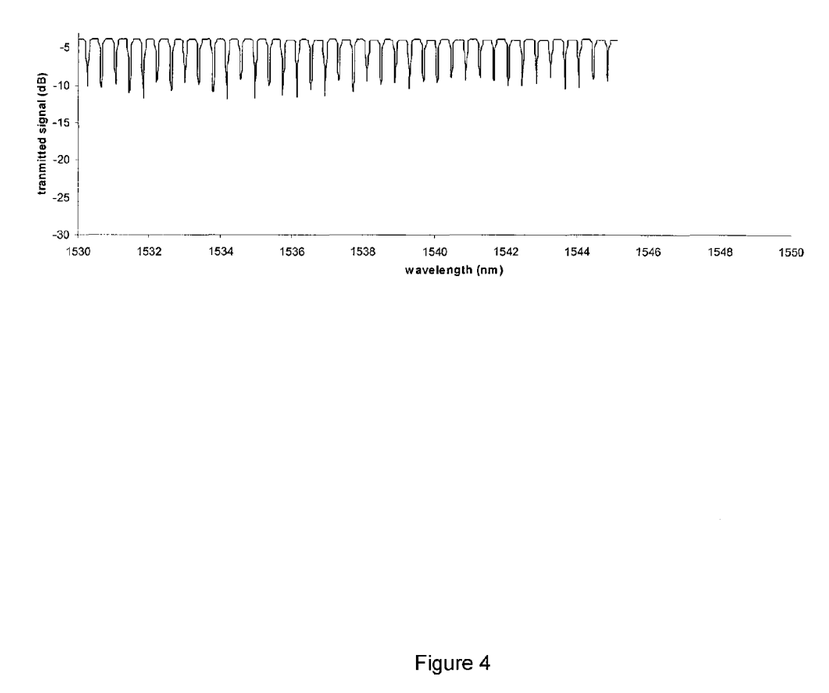
FIG. 4 is a transmission spectrum displaying the gap between adjacent mirrors or cells of a conventional wavelength blocker.

For free-space optics based WBs, in which each wavelength/channel is typically reflected by a single micro-mirror (or passes a single cell), the restriction on channel spacing is mostly due to the finite physical size of the mirrors or cells and the spatial gaps in between. For example, the transmission spectrum of a typical, 50 GHz spaced, liquid crystal WB is shown in FIG. 4. As shown, the small gaps in the mid of the passband are the results of the spatial gaps in among cells. This type of WB, if used in 100 GHz or 25 GHz spacing DWDM systems, often leads to signal distortion and thus penalty.

As described above, it is often a deficiency that a wavelength blocker designed for certain spacing cannot be used in DWDM systems of mixed channel spacing. In addition, currently, conventional techniques do not provide for wavelength blockers that are available at narrow channel spacing (e.g., 25 GHz channel spacing). For example, AWG based WBs or Add modules are available only at 100 GHz spacing. Even scaling to 50 GHz channel spacing using conventional techniques is inconceivably complex and prohibitively expensive for commercial applications.

As of now, MEMS and/or LC-based WBs are available at 100 and 50 GHz channel spacing. Free space optics helps to reduce the complexity and thus improve the scalability. Unfortunately, these techniques only work up to certain extent. Scaling to 25 GHz channel spacing remains a challenge and is still in large part economically impractical. More specifically, to separate a spectrum into 25 GHz spaced WDM wavelengths, it requires more than doubling the free-space path length, leading to a potential size issue. Reducing channel spacing in half doubles channel count, so the number of mirrors/LC cells required to intercept wavelength beams, and the number drivers to control the mirrors/cells, leading complexity related to alignment, packaging and reliability, given that tight channel spacing leads to much less tolerance to misalignment, center frequency offset, and others.

As difficult as it is to implement 25 GHz channel spacing, 10 Gbps at 25 GHz channel spacing is desirable for many reasons, as it offers the many benefits as opposed to 40 Gbps at 100 GHz spacing in high capacity DWDM transmissions. The benefits include better performance at lower cost due to low-cost 10G components, 6 dB lower OSNR requirement, 16 and 4 times more tolerant to chromatic dispersion and PMD, In particularly, for many installed legacy fiber links, which usually have large PMD, DWDM at 25 GHz spacing offers the desirable wavelength resources to support 40 Gbps or higher data rate via inverse-multiplexing.

It is also very desirable that a DWDM optical transport system support mixed channel spacing, for example, 25 GHz, 50 GHz, and 100 GHz, each tailored to optimal modulation format for best transmission performance.

It is therefore to be appreciated that various embodiments according to the present invention provide, among other, a band blocker that offers a universal solution for a versatile "broadcast and select" ROADM that can be applied in DWDM systems of arbitrary channel spacing. For example, channel spacing as low as 25 GHz are provided by the embodiments of the present invention.

Figure 5:
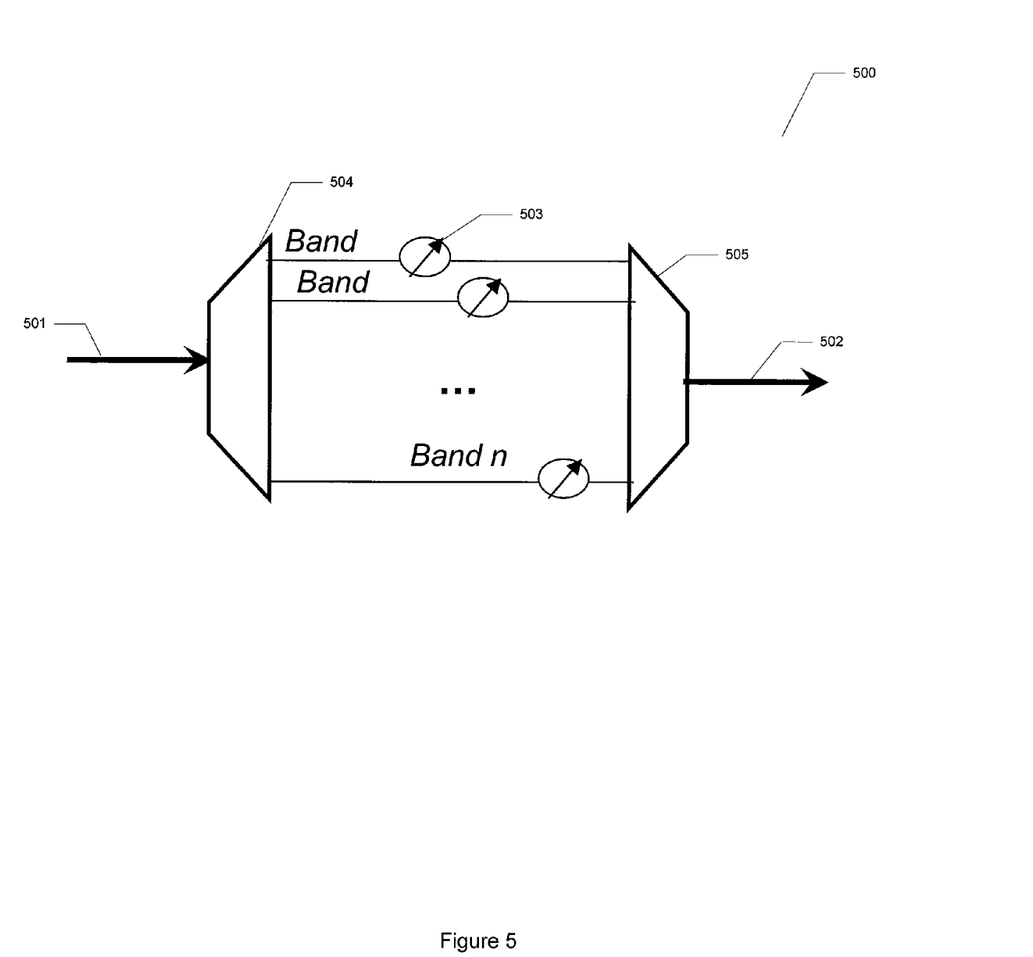
FIG. 5 is a simplified diagram illustrating a band blocker according to an embodiment of the present invention.

FIG. 5 is a simplified diagram illustrating band blocker according to an embodiment of the present invention. This diagram is merely an example, which should not unduly limit the scope of the claims. One of ordinary skill in the art would recognize many variations, alternatives, and modifications.

As shown in FIG. 5, a band blocker includes the following components:
1. input 501;
2. output 502;
3. switches (1-n) 503;
4. demultiplex module 504;
5. multiplex module 505.

As shown, the input 501 is adapted for connecting to a fiber optical line. For example, the fiber optical line is used to transmit an aggregate number of wavelengths. The demutltiplex module is configured to split the aggregate number of wavelengths into a number of bands. According to the embodiment, each of the bands is a collection of wavelengths with the same channel spacing. For example, a first band includes a predetermined number of channels that are spaced at 25 GHz apart. Similarly, a second band and a third band may respectively include wavelength groups at 50 GHz and 100 GHz channel spacings.

Each of the bands is coupled to a switch, which may turn the band on or off. As shown in FIG. 5, switches are implemented using variable optical attenuator (VOA). In addition to turning a band on or off, a VOA can also be used for controlling the intensity of a band of wavelengths. Among other things, by controlling the intensity of bands, VOAs can be used to dampen intensity ripples in the optical signals. Depending on the application, switches can also be implemented using other types of devices.

After the aggregate wavelengths are separated into bands, optical channels can then be used. For example, additional demultiplexing can be used to separate a band of wavelengths into a predetermined number of channels, which can then be used to data communication. According to an embodiment, the demultiplexing modules may be similar to those used in conventional wavelength blocker applications, such as the system shown in FIG. 1.

Figure 6:
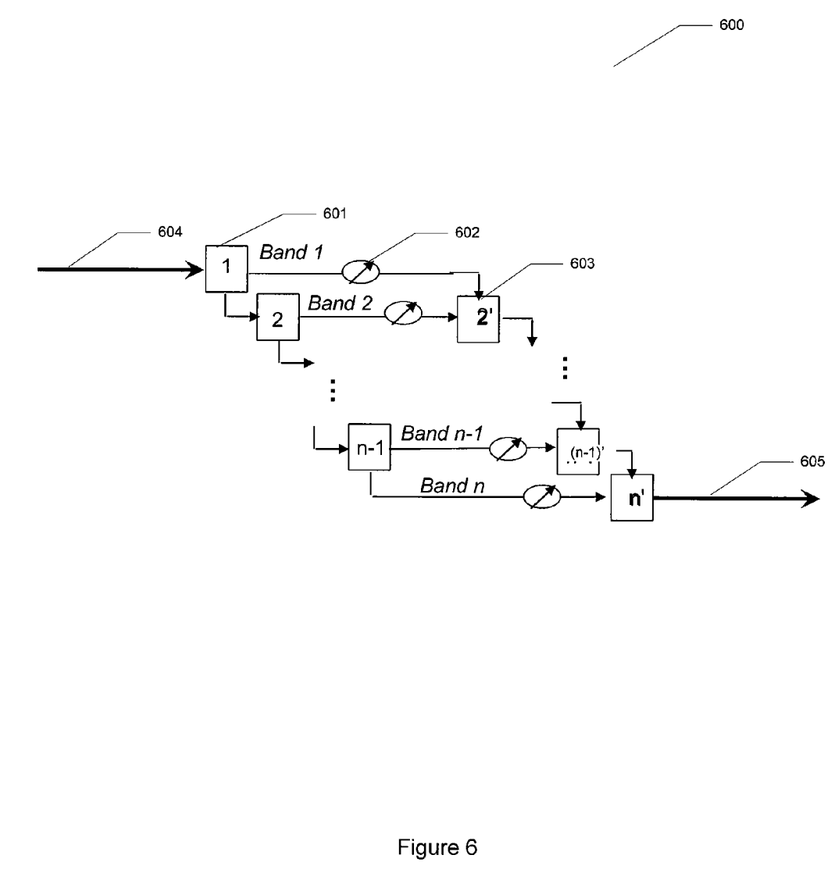
FIG. 6 is a simplified diagram illustrating a band blocker according to an embodiment of the present invention.
Figure 7:
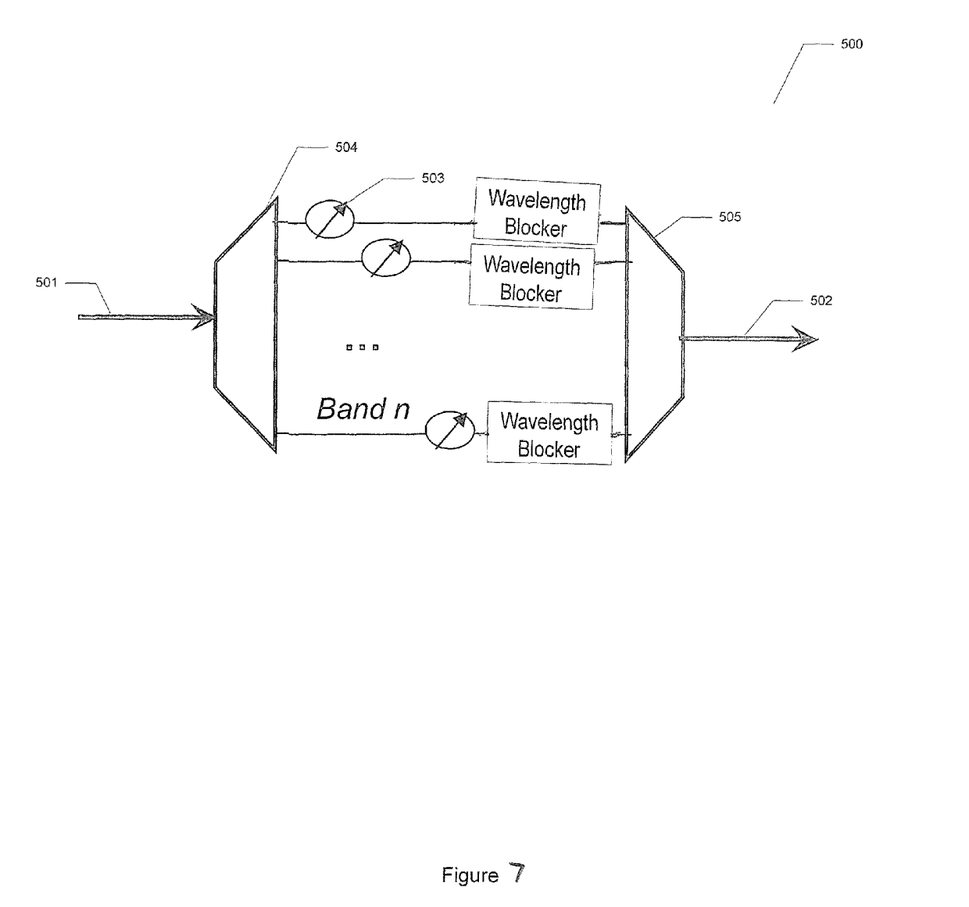
FIG. 7 is a simplified diagram illustrating the band block of FIG. 5 with a plurality of wavelength blockers.

FIG. 6 is a simplified diagram illustrating a band blocker according to an embodiment of the present invention. This diagram is merely an example, which should not unduly limit the scope of the claims. One of ordinary skill in the art would recognize many variations, alternatives, and modifications.

As shown in FIG. 6, a band blocker 600 includes the following:
1. band splitting modules 601;
2. switches 602;
3. band recombining modules 603;
4. an input 604; and
5. an output 605.

As shown, the are an n number of band splitting modules, switches, and band recombining modules. For example, each band splitting module, switch, and band recombining module correspond to a band.

The band splitting modules, switches, and band recombining modules are provided in a cascade configuration. Each band splitting module separates an input WDM line signal into several bands. For example, the band splitting module "1" as shown splits the wave channels from the input 604 into a Band 1 and the remaining band. The remaining band is then split by the band splitting module "2" into Band 2 and the remaining band less Band 2. Essentially, each band splitting module extracts a specific band. According to an embodiment of invention, a band splitting module includes an optical splitter. According to another embodiment, a band splitting module includes a filter (e.g., TFF-based filter) that is specifically configured to obtain a desired band of wavelengths.

Each output band is connected to a switch. According to a specific embodiment, switches as shown are implemented using variable optical attenuators (VOA), which can effectively block the band. VOAs are particularly effective when tuning to an attenuation of greater than 40 dB. It is to be appreciated that switches can be implemented using other types of devices as well. However, the use of VOA offers the capability of power adjustment on a band-to-band basis for performance optimization. Between each demultiplexing module and VOA, a band of signal may be used as a collection of channels, each channel having the same channel spacing.

Each of the band recombining modules is adapted to recombine the separated bands back into an aggregate optical signal. For example, the output of Band 1 is recombined with Band 2, and the combination of Band 1 and Band 2 is then combined to Band 3 (not shown in FIG. 6), and so on. At the band recombining module n', all the bands are combined again, and become available as an output. For example, the band recombining modules couple the bands back to an output WDM line signal.

Depending on the application, the band recombining module may be implemented in various ways. In a specific embodiment, a band recombining module is implemented using a "reverse filter". For example, to combine Band 1 and 2, a filter (e.g., a TFF-based filter) that is reverse of band splitting module 2 is used. According to another embodiment, couplers are used. It is to be understood that other types of devices may be used as well.

According to embodiments, a band-based broadcast and select ROADM can be applied directly to a DWDM system at any channel spacing, in particular. In certain application, a ROADM system can work with small channel spacing, as low as 25 GHz.

The band splitter/combiner can also be constructed using several TFF group filters in series. For example, a band blocker is truly low cost to start with minimal one pair of group filters, and low cost to expand by simply adding more group filters. In various embodiments, the band blocker are implemented using passive components, which are simple to built, stable, and reliable with no moving parts.

According to an embodiment, a band blocker provides uniform transmission spectrum within the bands, that is a key component to a broadcast and select ROADM solution for DWDM transport systems with mixed channel spacing, in particular with 25 GHz or smaller channel spacing;

In another embodiment, a band blocker is implemented using band splitters and band combiners, and an array of VOA/on-off switches in between. The use of VOA offers the benefit of power optimization via band-based power equalization or emphasis. For example, a VOA has a maximum attenuation of no less than 40 dB. The band splitter and/or combiner can be several TFF group filters in series, or an arrayed waveguide grating. In a specific embodiment, a band splitter has adjacent band isolation of no less than 18 dB.

It is to be appreciated that embodiments of the present invention provides many advantages over conventional techniques. For example, the present invention offers a simple and reliable solution to apply broadcast and select ROADM to DWDM transport systems with ultra narrow and mixed channel spacing. Among other things, by providing wave signals in bands of channels of identical channel spacing, the present invention allows wavelengths to be efficiently utilized in optical transport systems. For example, wavelengths at different channel spacings may be transmitted using a main optical line, and then divided up into bands for convenient use. In addition, embodiments of the present invention are relatively inexpensive to implement in comparison to conventional techniques, and are scalable in many ways. It is also to be appreciated that certain embodiments of the present invention are compatible with existing technology, thereby allowing easy implementation. There are other benefits as well.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for an optical network, the system comprising:
    an input configured to receive an input signal through a first optical input;
    a band splitting module, the band splitting module coupled to the input, the band splitting module configured to separate the input signal into a plurality of bands, the plurality of bands including a first band and a second band, the first band including a first plurality of wave channels, the first plurality of wave channels having a first channel spacing, the second band including a second plurality of wave channels, the second plurality of wave channels having a second channel spacing different from the first channel spacing, and wherein the band splitting module outputs the first band and the second band and wherein the first band and the second band output from the band splitting module do not overlap each other;
    a plurality of switches, each switch configured to turn off or on each respective one of the plurality of bands;
    a band recombining module, the band recombining module configured to couple the plurality of bands; and
    an output coupled to the band recombining module, the output configured to provide an output signal, the output signal being a combination of the plurality of bands.

2. The system of claim 1 wherein the plurality of bands includes a third band, the third band having a third channel spacing, the third channel spacing being equal to the first channel spacing.

3. The system of claim 1 is a DWDM system.

4. The system of claim 1 wherein the band recombining module includes a plurality of filters.

5. The system of claim 1 wherein the band recombining module includes a plurality of filters, the plurality of filters having a series configuration.

6. The system of claim 1 wherein the band recombining module includes a plurality of couplers.

7. The system of claim 1 wherein the band recombining module includes a plurality of filters, the plurality of filters having a cascade configuration.

8. The system of claim 1 wherein each of the plurality of switches comprises a variable optical attenuator.

9. The system of claim 8 wherein the variable optical attenuator is capable of tuning greater than or at 40 dB.

10. The system of claim 1 wherein the first channel spacing is approximately 25 GHz.

11. The system of claim 1 wherein the second channel spacing is approximately 50 GHz.

12. The system of claim 1 wherein the band splitting module comprises a plurality of filters, the filters connected in series.

13. The system of claim 1 wherein the band splitting module comprises a plurality of filters, the filters connected in a cascade configuration.

14. The system of claim 1 wherein the band splitting module comprises a plurality of couplers.

15. The system of claim 1 wherein the band splitting module comprises a plurality of TFF-based filters.

16. A system for an optical network, the system comprising:
   an input configured to receive a first input signal through a first optical input;
   a band splitting module, the band splitting module coupled to the input, the band splitting module configured to separate the input signal into a plurality of bands, the band splitting module including a first filter and a second filter, the plurality of bands including a first band and a second band, the first filter being configured to separate the input signal into the first band and a second input signal, the second filter being configured to separate the second input signal into the second band and a third input signal, the first band including a first plurality of wave channels, the first plurality of wave channels having a first channel spacing, the second band including a second plurality of wave channels, the second plurality of wave channels having a second channel spacing different from the first channel spacing, and wherein the band splitting module outputs the first band and the second band and wherein the first band and the second band output from the band splitting module do not overlap each other;
   a plurality of switches, each switch configured to turn off or on each respective one of the plurality of bands;
   a band recombining module, the band recombining module configured to couple the plurality of bands; and
   an output coupled to the band recombining module.

17. The system of claim 16 wherein the first filter and the second filter are TFF-based filters.

18. The system of claim 16 wherein the first filter and the second filter are in a cascade configuration.

19. The system of claim 16 wherein the band recombining module comprises a plurality of couplers.

20. The system of claim 16 wherein the band recombining module comprises a third filter and a fourth filter, the third filter being a reverse of the first filter.

21. A method for optical providing band blocking, the method comprising:
   receiving a first input optical signal;
   splitting the first input optical signals into a predetermined number of bands, the bands including a first band and a second band, the first band including a first plurality of wave channels, the first plurality of wave channels having a first channel spacing, the second band including a second plurality of wave channels, the second plurality of wave channels having a second channel spacing different from the first channel spacing, and outputting the first band and the second band wherein the first band and the second band do not overlap each other;
   controlling the first band by turning off or on the first band using a first switch;
   controlling the second band by turning off or on the second band using a second switch;
   coupling the bands into an output; and
   providing the output.

22. The method of claim 21 wherein the first channel spacing is approximately 25 GHz.

23. The method of claim 21 wherein the first switch comprises a first variable optical attenuator (VOA) and the second switch comprises a second VOA.

24. The method of claim 23 wherein the first VOA adjusts attenuation of the first band and the second VOA adjusts attenuation of the second band.

25. The method of claim 21 further obtaining a first channel from the first band.

26. The system of claim 1 further comprising:
   a plurality of wavelength blockers corresponding to the plurality of switches and disposed between the plurality of switches and the recombining module.

27. A system for an optical network, the system comprising:
   an input configured to receive an input signal through a first optical input;
   a band splitting module, the band splitting module coupled to the input and configured to separate the input signal into a first band and a second band, the first band including a first plurality of wave channels having a first channel spacing, the second band including a second plurality of wave channels having a second channel spacing different from the first channel spacing;
   a plurality of switches, each switch being configured to turn off or on each respective one of the first and second bands;
   a plurality of wavelength blockers corresponding to the plurality of switches and disposed between the plurality of switches and a band recombining module, wherein the band recombining module is configured to couple the first band and the second band; and
   an output coupled to the band recombining module, wherein the output is configured to provide an output signal comprising a combination of the first band and second band.

* * * * *